United States Patent [19]

Gevaert

[11] 4,281,593

[45] Aug. 4, 1981

[54] DEVICE FOR PREPARING FOOD PRODUCTS FROM COOKED AND EXPANDED CEREALS AND PRODUCTS OBTAINED

[75] Inventor: Stephan Gevaert, Sint-Martens-Latem, Belgium

[73] Assignee: Omer Gevaert, Geraardsbergen, Belgium

[21] Appl. No.: 51,232

[22] Filed: Jun. 22, 1979

[30] Foreign Application Priority Data

Jun. 22, 1978 [BE] Belgium ................................ 188771

[51] Int. Cl.³ .............................................. A47J 27/08
[52] U.S. Cl. ...................................... 99/349; 99/372; 99/426; 99/439
[58] Field of Search ................. 99/349, 341, 351, 372, 99/383; 100/84, 93 P, 259, 272, 281, 283; 425/DIG. 222, 450.1, 451.5, 451.7, 451.6, 451.9, 589, 592–593

[56] References Cited

U.S. PATENT DOCUMENTS

| 1,214,627 | 2/1917 | Wild | 99/349 |
| 1,234,577 | 7/1917 | Squire | 100/283 X |
| 1,657,167 | 1/1928 | Lidseen et al. | 99/351 |
| 1,874,608 | 8/1932 | Parr | 99/383 |
| 2,912,924 | 11/1959 | Dahl et al. | 99/349 X |
| 3,976,416 | 8/1976 | Hehl | 425/451.6 X |

Primary Examiner—Harvey C. Hornsby
Assistant Examiner—Arthur O. Henderson
Attorney, Agent, or Firm—Finnegan, Henderson, Farabow, Garrett & Dunner

[57] ABSTRACT

There is described a device for preparing food products from cereals which have been pressure-cooked and thereafter expanded, which comprises a mould comprised of a hollow heated die to which the cereals are fed, a punch cooperating with said mould to close and open the cavity thereof by sliding, at least one jack so connected to the punch as to drive same alternately in and out of the mould cavity, said jack enabling to exert through the punch a pressure on the mould while cooking the cereals, stop means for stopping temporarily the alternating movement of the punch or of a driving member therefor in a position where said punch does not exert a pressure any more on the mould and where the mould cavity is not yet open, a device for feeding cereals to be cooked and a device for discharging the product from expanded cereals thus obtained.

19 Claims, 4 Drawing Figures

DEVICE FOR PREPARING FOOD PRODUCTS FROM COOKED AND EXPANDED CEREALS AND PRODUCTS OBTAINED

This invention relates to a device for preparing food products from cereals which are first pressure-cooked and then expanded, as well to those products obtained by operating such device.

Those devices for preparing automatically food products from cooked and expanded cereals which have been tested up to now, have the drawback of using a cam and a guide member for those parts enabling to pressure-cook and expand the cereals. Said cam and guide member do indeed undergo rapidly such a wear that the products prepared by means of such devices do not fulfill any more the required qualities and this due to the desired expansion being impossible to obtain accurately. On the other hand, these devices are rather intricate as regards the structure thereof and they are consequently costly.

An essential object of the invention is to obviate the above drawbacks and to provide an easily and rapidly-built device which enables to obtain a high accuracy rate for the cereals expansion while insuring a very high cooking pressure.

For this purpose the device according to the invention comprises a mould comprised of a hollow heated die to which the cereals are fed, a punch cooperating with said mould to close and open the cavity thereof by sliding, at least one jack so connected to the punch as to drive same alternately in and out of the mould cavity, said jack enabling to exert through the punch a pressure on the mould while cooking the cereals, stop means for stopping temporarily the alternating movement of the punch or of a driving member therefor in a position where said punch does not exert a pressure any more on the mould and where the mould cavity is not yet open, a device for feeding cereals to be cooked and a device for discharging the product from expanded cereals thus obtained.

Advantageously the jack comprises a driving rod which is hingedly connected to the punch-driving member, said member being also hingedly connected to that punch end opposite the end entering the mould and bearing on a fixed shaft to be swingable thereabout.

In an advantageous embodiment of the invention, the stop means is a movable stop which can be moved through a control member, between two end positions the one of which lies in the path of at least one punch part or the driving member thereof respectively to stop same in said position allowing the cooked cereals to expand, the movable stop being brought to said end position approximately at the time where the punch reaches that position thereof where it presses the mould, said movable stop being located outside said path in the other end position thereof and being brought to said position as the cereals expansion is completed.

In a further embodiment of the invention, the device comprises a feed regulator which cooperates with the punch-driving mechanism to feed the products to be cooked and discharge the expanded products.

Other details and features of the invention will stand out from the description given below with reference to the accompanying drawings in which.

In the various figures the same reference numerals pertain to similar elements.

Figure 1:
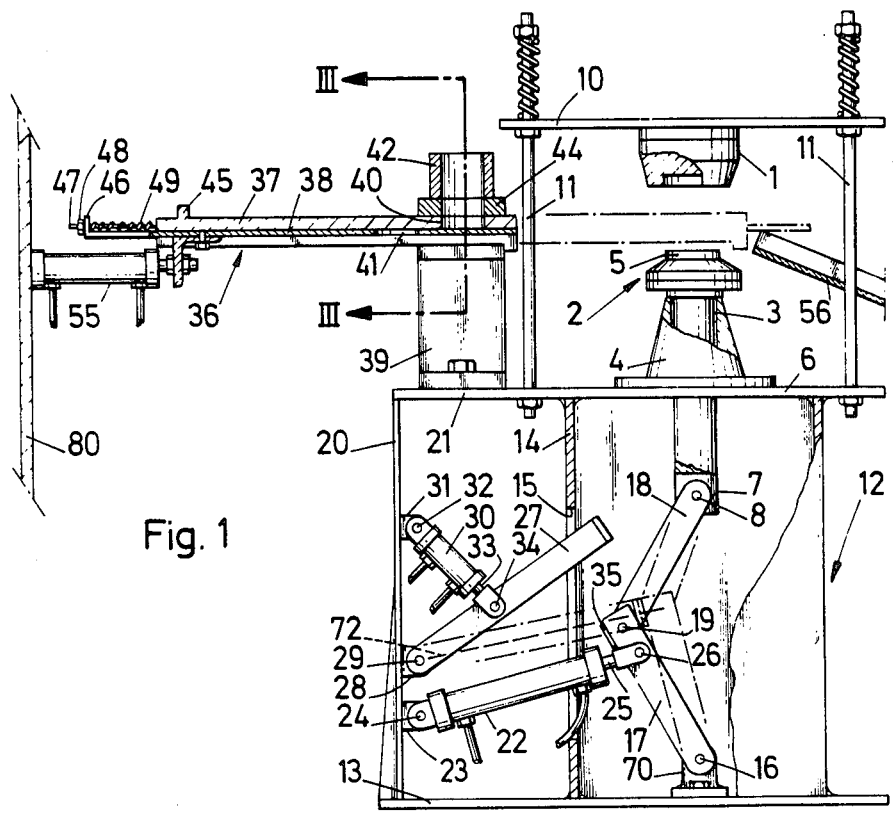
FIG. 1 is an elevation view partly in cross-section of a first embodiment of the invention.
Figure 3:
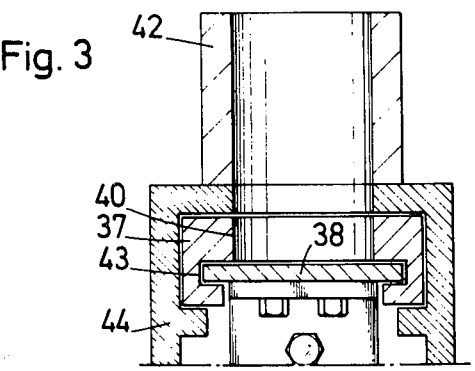
FIG. 3 is a cross-section view along line III—III from FIG. 1.

The device for preparing food products from cooked and expanded cereals as shown in FIG. 1 comprises a mould comprised of a hollow die 1 in the shape of an inverted container which cooperates with a punch 2 which by sliding inside the die, can close and open the mould cavity.

In the example shown, the punch 2 is guided vertically to allow an alternating movement of punch head 5 in and out of die 1 lying underneath said punch 2. The rod 3 of punch 2 slides through a guide ring 4 bearing on a platen 6 of the device frame. That end of punch rod 3 removed from head 5 is of U-shape in cross-section and has thereby two flat lugs 7 in parallel relationship which depend vertically and through which passes a shaft 8 at right angle to the lug planes.

The die is fixedly hung from a top plate 10 which bears on platen 6 through uprights 11. The platen 6 in turn is supported by the frame which in the embodiment as shown, is comprised of a housing 12 in the shape of a straight parallelepiped the bottom of which is formed by the foundation 13 and the cover by the platen 6 proper. The one side surface (shown in 14 in FIG. 1) from said housing 12 is provided with a large opening 15.

On the foundation 13 is arranged a support 70 for a shaft 16 in parallel relationship with shaft 8, to which shaft 16 is connected with the one end thereof a bar-like drive arm 17 to be swingable thereabout. In the same way a bar-like drive arm 18 is connected with the one end thereof to shaft 8 to be swingable thereabout. Both drive arms 17, 18 are hingedly connected together at the other ends thereof by means of a common shaft 19 in parallel relationship with shafts 8 and 16 about which hinge said arms.

In the embodiment as shown in FIG. 1, an upright 20 made fast to foundation 13, is provided some distance away from housing 12 facing housing surface 14. Said upright is anchored to housing 12 through a sidewise extension 21 of platen 6.

A jack 22 is connected to upright 20 through a support 23 for a shaft 24 about which the jack is swingable. Said jack is for instance a double-action hydraulic jack the operating rod 25 of which goes through opening 15 in housing 12. The end of said rod 25 is connected to the one drive arm, in the embodiment shown the arm 17, through an hinging axis 26.

Under the action of operating rod 25, the hinged arms 17 and 18 can move from the one end position where the rod 25 having returned to the initial position thereof inside jack 22, the arms substantially slant relative to one another as shown in solid lines in FIG. 1, to another end position in which the rod 25 projecting as far as possible, the arms 17 and 18 as seen sidewise, lie in vertical alinement with one another (said position is not shown in FIG. 1).

In the embodiment as shown in FIG. 1, a stop bar 27 is connected to upright 20 through a support 28 for a shaft 29 about which the stop is swingable. Said shaft 29 lies in parallel relationship with shafts 8, 16 and 19 and said stop rod is so arranged as to be swingable in the same plane as the one drive arm 17.

A jack 30 is also connected to upright 20 through a support 31 for a shaft 32 about which said jack is swingable. Said jack may for instance also be a double-action hydraulic jack the operating rod 33 of which is connected at the end thereof through a hinging axis 34, to stop 27.

When rod 33 lies in the end position thereof, the stop 27 is brought by swinging about shaft 29, to a position where the end thereof lies in the circular path of the top end of arm 17. In this location said arm 17 is provided with an overthickness 35 used as bearing surface for stop 27. The stop bar is then so directed that the force imparted by drive arm 17 to said bar in the stop position, lies in the direction of the lengthwise axis 72 of stop bar 27. The stop position is shown in dot-and-dash lines in FIG. 1. When rod 33 lies in the initial position thereof, the stop 27 has such a position that arms 17 and 18 can move completely freely.

The device according to the invention further comprises a feed regulator 36. Said regulator comprises a set of two superimposed horizontal plates 37 and 38 which are slidable between two end positions in the plane thereof, on a support 39 which is arranged next to punch 2. The upper plate 37 and the lower plate 38 are each provided with a cut-out 40, 41 respectively. The volume size of cut-out 40 corresponds to the volume of cereals to be fed to the mould. Said cut-out 40 lies in that end position of plate 37 farthest away from the mould, underneath an equipment for feeding cereals which is comprised in the example shown, of a feeding cylinder 42 made fast to support 39. The cut-out 41 lies in that end position of plate 38 farthest away from the mould, farther away from the mould than cut-out 40, in such a way that said cut-out 40 is sealed downwards by the lower plate 30 to thus form a container to receive the cereals fed by cylinder 42.

The cut-out 40 lies in the other end position of plate 37, between die 1 and punch 2, precisely below the die hollow part. The cut-out 41 lies in the other end position of plate 38, precisely below cut-out 40 to allow the products contained therein settling by gravity on punch head 5.

The lower plate 38 is so arranged as to be slidable inside a guide groove 43 provided along the lower surface of top plate 37.

Operating means, in the present case formed by a jack 55, are fixedly connected on the one hand to wall 80 and on the other hand to plate 38 to move same in the direction of the mould. Said jack is for example comprised of a double-acting hydraulic jack which is fastened to upright 20. The plate 38 simultaneously drives due to the friction connection therebetween, plate 37. Both plates are guided through a slideway 44 fastened to support 39. Plate 37 is provided on the top surface thereof with a projection 45 which in that position of plate 37, farthest away from the mould, lies at a distance from slideway 44 which is equal to that distance required to bring cut-out 40 precisely underneath the hollow in die 1.

In the embodiment as shown in FIG. 1, the lower plate 38 projects relatively to plate 37 in the direction opposite to the mould when said plates lie in the end position thereof farthest away from the mould. The plate 38 is provided at said projecting end with a rim 46 lying at a distance from that end of plate 37 fathest away from the mould which is equal to that distance over which the cut-out 41 is to be moved to lie precisely below mould 1. Said rim 46 slides over a rod 47 projecting relative to plate 37 along the plate movement axis. On the screw-threaded end of said rod 47 is screwed an adjusting nut 48 while a return spring 49 is arranged between spring 46 and plate 37.

The operation of the above-described device is follows:

When the cut-out 40 lies below the feeding means 42, it is automatically filled with cereals to be cooked. At this time the punch head 5 lies in high position that is as far as possible inside the cavity of die 1 and under the action of the operating rod, both drive arms 17 and 18 are alined vertically as seen from the side, punch 2 exerting in such a position the maximum pressure against the mould. At this time also the stop bar 27 already lies in low position, that is the bar lies in the path the arm 17 will have to follow to lower punch 2. After the time required for cooking under pressure those cereals lying between the punch and the die, the operating rod is returned to the original position thereof, but the stop 27 by engaging the bearing surface 35 from drive arm 17 does only allow a limited downwards sliding of punch 2 and this in such a way that there occurs an expanding of the cereals cooked inside the mould, that is the mould cavity remains closed. The accuracy of the adjustment of stop 27 in abutting position, is consequently essential as the quality of the expanded product will mainly depend therefrom. After the expanding time for the product, the stop 27 will be raised under the action of rod 33 from jack 30 and rod 25 goes on pulling arm 17, which causes punch 2 to move way from die 1, the expanded product cake bearing on punch head 5.

During the return of rod 25 to the original position thereof, the rod from jack 55 pushes towards the mould said plate 38 which drives in turn due to the friction connection, said plate 37. Said plates move above the punch head by pushing horizontally in front thereof the expanded product which falls on the other side of punch 2 into a trough 56 for collecting the end product. When cut-out 40 lies precisely below the hollow in die 1, the projection 45 abuts slideway 44 which prevents plate 37 from further moving under the action of jack 55. The plate 38 however goes on moving forward against the action of return spring 49, until rim 46 engages the end of plate 37. In such a position, the cut-out 41 lies precisely below cut-out 40 which releases the cereals contained inside cut-out 40, said cereals falling on the top surface of punch head 5. At this moment jack 55 returns the operating rod thereof to the original position and drives in this direction plate 38 which due to the return action of spring 49 first slides relative to plate 37 until rim 46 engages adjusting nut 48. The cut-out 41 is then no more located underneath cut-out 40 and said latter one is closed again by plate 38. Both plates are then driven together towards the original position thereof where cut-out 40 lies below cylinder 42 and is filled again.

As soon as the superimposed plates are no longer in the punch path, said punch is automatically driven upwards into the die hollow and the cycle starts again.

Figure 2:
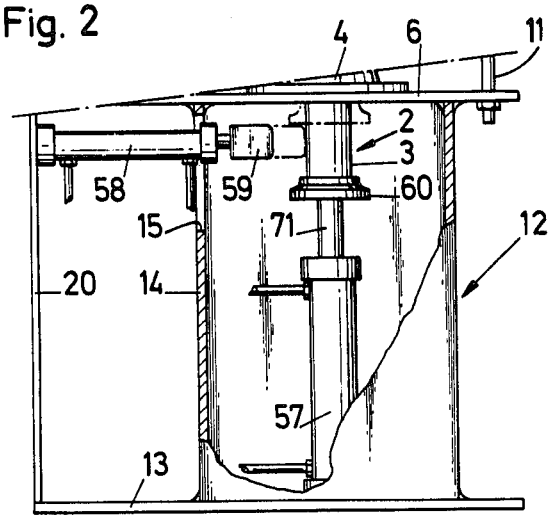
FIG. 2 is a part elevation view of a second embodiment of the invention.

In the embodiment as shown in FIG. 2, the design is such that operating rod 71 from jack 57 for moving the punch and rod 3 from the punch are coaxial and it is even possible for both parts to be integral, without any driving or linking means being provided therebetween. Jack 57 is then fastened to foundation 13 on the vertical line below punch 2 and the operating rod moves along the vertical movement axis of the punch. It is possible to provide a side jack 58 the rod of which moves at right angle relative to punch rod 3, a stop 59 passing through opening 15 in housing 12. In the end position as shown in dot-and-dash lines, said stop 59 lies in the lowering path of a projecting ring 60 provided on the punch rod and used as bearing surface for stop 59. As the remaining part of the device is designed in the same way as shown in FIG. 1, no further showing thereof is deemed necessary.

Figure 4:
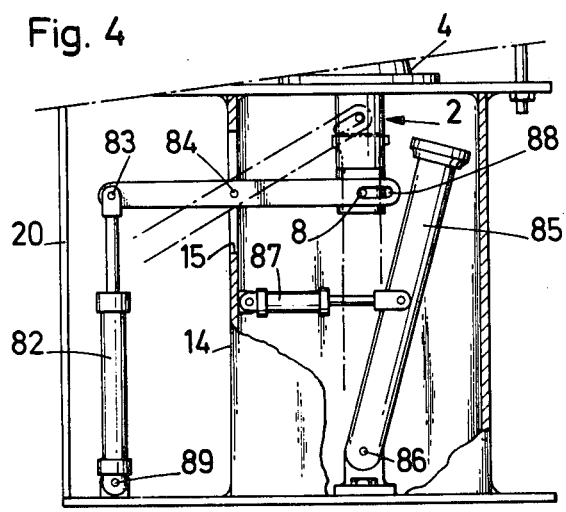
FIG. 4 is a part elevation view of a third embodiment of the invention.

In the embodiment as shown in FIG. 4, the driving member for the punch does only comprise a single drive arm 81. At the one end thereof, said arm is connected to the one end of the rod from a jack 82, through a shaft 83, in such a way as to be swingable thereabout. At the other end thereof, said arm 81 is connected to that end of punch 2 opposite to head 5 through shaft 8, to be swingable thereabout. Said shaft 8 goes through an opening provided at said end of arm 81, said opening extending along the lengthwise direction of arm 81 to allow together with the swinging of the arm about shaft 8, a sliding of said arm relative to the shaft. The arm 81 is finally supported in the center portion thereof by a fixed shaft 84 to be swingable thereabout, the three shafts 8, 84 and 83 being so arranged as to lie in parallel relationship. Jack 82 is made fast to foundation 13 of the frame on a fixed shaft 89 to be swingable thereabout and said jack lies outside housing 12 facing surface 14 thereof. The arm 81 goes through opening 15 in the housing and is used consequently as lever arm between the punch and jack 82, said lever arm swinging about shaft 84.

A stop bar 85 is made fast to foundation 13 through the support for a fixed shaft 86 about which said stop is swingable. Said stop rod is so arranged that in vertical position the top end thereof can stop the lowering of punch 2 in the expanding position for the cereals. A jack 87 the rod of which is hingedly connected to stop 85 allows to bring same to the vertical position when the punch 2 lies in high position, and to move said stop away as the expanding of the cereals is completed. As the remainder of the device is designed in the same way as in FIG. 1, a further detailed showing is deemed unnecessary.

It is also to be noted that the operation of the embodiments as shown in FIGS. 2 and 4 remains precisely the same as for the embodiment according to FIG. 1.

It must be understood that the invention is in no way limited to the above embodiments and that many changes can be brought herein without departing from the scope of the invention as defined in the appended claims.

For instance the drive member for the punch might comprise not only two hinged drive arms but also a larger number of such arms.

In the embodiment as shown in FIG. 1, jack 22 might be so arranged that an operating rod coaxial with rod 25 projects from the opposite jack end and passes through a slit provided therefor in upright 20. The end of said rod might be hingedly connected to the one end of a lever arm, said lever arm being swingable about a fixed shaft supported by upright 20 and hingedly connected at the other end thereof to the bottom surface of plate 38. The rod from jack 22 and said lever arm would be so arranged as to have the cut-outs 40 and 41 underneath the die hollow when operating rod 25 lies in starting position and the plates 37 and 38 in the position thereof remote from said mould when operating rod 25 is in the end position. Such an embodiment allows to dispense with jack 55.

I claim:
1. A device for preparing food products from cereals which are pressure cooked and thereafter expanded, comprising
   (a) a mould comprised of a hollow heated fixed die and having a cavity defined therein;
   (b) a punch entering through an opening of the mould and cooperating with said mould;
   (c) a jack connected to the punch to drive the punch alternately between a first position wherein the punch is in the hollow die of the mould, which is closed through the punch, and exerts on the mould a pressure transmitted through the jack during the cooking of the cereals, and a second position wherein the punch is out of the mould which is then open;
   (d) stop means for temporarily stopping the movement of the punch, or of a driving member therefor, between the first and the second position, in a third position wherein the punch does not exert a pressure on the mould and the mould cavity is not yet open, to permit expansion of the cereal;
   (e) means for automatically feeding cereals to be cooked through said opening of the mould; and
   (f) means for automatically discharging the products from expanded cereals through said opening.

2. A device as defined in claim 1, in which the stop means is a movable stop which can be moved through a control member between two end positions, the one of which lies in the path of at least one punch part or the driving member thereof respectively to stop the punch in said third position allowing the cooked cereals to expand, the movable stop being brought to said end position approximately at the time where the punch reaches said first position, said movable stop being located outside said path in the other end position thereof and being brought to said end position as the cereals expansion is completed.

3. A device as defined in claim 1, in which the jack comprises an operating rod coaxially connected to the punch and integral therewith.

4. A device as defined in claim 1, in which the jack comprises a driving rod which is hingedly connected to the punch-driving member, said member being also hingedly connected to that punch end opposite the end entering the mould and bearing on a fixed shaft to be swingable thereabout.

5. A device as defined in claim 4, in which the drive member comprises a single drive arm.

6. A device as defined in claim 4, in which the drive member comprises at least two arms hinged together, the one hinged arm being supported at the unhinged end thereof on a fixed shaft to be swingable thereabout and the other arm being swingably connected at the unhinged end thereof to that punch end opposite the end entering the mould, the jack operating rod being swingably connected to one one said hinged arms.

7. A device as defined in claim 2, in which the movable stop in abuting position, engages a bearing projection fixedly provided therefor on the punch rod.

8. A device as defined in claim 2, in which the movable stop in abuting position, engages the drive arm or the one of the drive arms respectively forming the drive member.

9. A device as defined in claim 8, in which the end of the jack operating rod is swingably connected to said one hinged arm, the jack bearing on a fixed support to be swingable relative thereto, and the movable stop is a bar swingable at the one end thereof about a shaft in such a way that in abuting position, the other end thereof bears on the hinged end from said arm and the force imparted by said arm to said stop bar be in the direction of the lengthwise axis of said stop bar.

10. A device as defined in any one of claims 2 and 7 to 9, in which the control means for the movable stop is a jack.

11. A device as defined in claim 1 in which the mould die is arranged above the punch in such a way that when the die is spaced from the punch, the cooked and expanded products can be discharged by gravity from the die to rest on the punch and to be discharged therefrom by simply pushing horizontally thereon.

12. A device as defined in claim 1 in which the device for feeding cereals to be cooked is a feed regulator comprising a set of two superimposed horizontal plates which are slidable under the action of moving means, between two end positions in the plane thereof, on a support lying next to the mould punch substantially level therewith, the upper plate and the lower plate each having a cut-out, the size of the cut-out in the upper plate corresponding to the amount of cereals to be fed to the mould, said cut-out lying in the first end position of both plates, farthest away from the mould, underneath a feeding means for the products to be cooked and expanded, the cut-out in the lower plate being located in said position farthest away from the mould than the cut-out in the upper plate, said upper plate cut-out thus being sealed by the lower plate to form a container to receive a charge from said cereals, the cut-out in the upper plate lying in the second position of said plate between the die and the punch, precisely underneath the die hollow, a stop means preventing the movement of the upper plate beyond said position under the action of said moving means which still drive the lower plate, the cut-out in the lower plate being arranged in the second position thereof, precisely underneath the cut-out in the upper plate, to let the products contained therein settle by gravity on the punch, the plate moving means returning thereafter both plates to the first position thereof.

13. A device as defined in claim 12, in which the lower plate is so arranged as to be slidable inside a guide groove provided along the lower surface of the lower plate and the moving means are connected to the lower plate which is connected to the upper plate by spring means against which the moving means have to operate to bring the lower plate to said second end position thereof, said spring means allowing to first let the lower plate slide relative to the upper plate at the start of the plate movement under the action of the moving means towards the first end position thereof, in such a way that the cut-outs in both plates will not lie one above the other underneath the feeding means.

14. A device as defined in claim 12 in which the plates slide through fixed guides provided on the feeding means, the stop means for the upper plate being comprised of a projection arranged in the first end position of said plate at a distance from said guides equal to the movement distance required to bring the upper plate cut-out precisely below the die.

15. A device as defined in claim 13 in which in the first end positions of the plates, the lower plate projects relative to the upper plate in a direction opposite to the mould, the end of said lower plate being provided with a rim located at a distance from the upper plate equal to that distance required to bring the cut-outs in both plates precisely one above the other, said spring means being comprised of a return spring arranged between the upper plate and said rim.

16. A device as defined in claim 12 in which the operating means for the plates is comprised of a jack the operating rod of which directed towards the mould is fixedly connected to the lower plate.

17. A device as defined in claim 12 in which the operating means for the plates is that operating jack controlling the alternating movement of the punch, a lever arm supported in the center thereof on a fixed shaft to be swingable thereabout being hingedly connected at the one end thereof, to the jack rod and at the other end thereof, to the lower plate of the feed regulator, in such a way that said lever arm as the punch is moved away from the mould, causes the movement of said plates to the second position thereof and the return thereof to the first end position before the punch reaches the plate level.

18. A device as defined in any one of claims 12 to 17, in which the feed regulator plates are also used as discharge device for the expanded product which is pushed during the movement of said plates in a horizontal plane to the second end position thereof, into a trough arranged on that punch side opposite to the side where the feeding means are provided.

19. Food products prepared from cooked and expanded cereals, obtained with a device as defined in claim 1.

* * * * *